United States Patent
Alderman et al.

(10) Patent No.: US 10,821,388 B2
(45) Date of Patent: Nov. 3, 2020

(54) CLIP-ON MONITOR FOR DETECTING CLOGGED AIR-FILTERS

(71) Applicants: Jason Alderman, Duarte, CA (US); Scott Sullivan, San Francisco, CA (US)

(72) Inventors: Jason Alderman, Duarte, CA (US); Scott Sullivan, San Francisco, CA (US)

( * ) Notice: Subject to any disclaimer, the term of this patent is extended or adjusted under 35 U.S.C. 154(b) by 224 days.

(21) Appl. No.: 15/950,175

(22) Filed: Apr. 11, 2018

(65) Prior Publication Data
US 2019/0015768 A1    Jan. 17, 2019

Related U.S. Application Data

(60) Provisional application No. 62/486,386, filed on Apr. 17, 2017.

(51) Int. Cl.
| | |
|---|---|
| *B01D 46/10* | (2006.01) |
| *B01D 46/46* | (2006.01) |
| *G01F 1/075* | (2006.01) |
| *G01F 1/69* | (2006.01) |
| *B01D 46/00* | (2006.01) |
| *B01D 46/44* | (2006.01) |
| *B01D 46/52* | (2006.01) |

(52) U.S. Cl.
CPC ......... *B01D 46/0086* (2013.01); *B01D 46/10* (2013.01); *B01D 46/444* (2013.01); *B01D 46/448* (2013.01); *B01D 46/46* (2013.01); *B01D 46/521* (2013.01); *G01F 1/075* (2013.01); *G01F 1/69* (2013.01); *B01D 2273/30* (2013.01); *B01D 2275/205* (2013.01)

(58) Field of Classification Search
CPC .. B01D 46/0086; B01D 46/10; B01D 46/521; B01D 46/46; B01D 46/448; B01D 46/444; B01D 2273/30; B01D 2275/205; G01F 1/075; G01F 1/69
USPC ............ 55/DIG. 34; 96/416, 417, 418, 422; 116/DIG. 25; 356/239.1, 432
See application file for complete search history.

(56) References Cited

U.S. PATENT DOCUMENTS

| | | | | |
|---|---|---|---|---|
| 5,325,707 | A * | 7/1994 | Slater | B01D 46/0086 73/38 |
| 6,743,281 | B1 * | 6/2004 | Miller | B01D 46/0086 116/DIG. 25 |
| 7,012,685 | B1 * | 3/2006 | Wilson | B01D 46/0086 356/239.1 |
| 2007/0022881 | A1 * | 2/2007 | Falcon | B01D 46/008 96/421 |
| 2011/0315019 | A1 * | 12/2011 | Lyon | B01D 46/0086 96/418 |

(Continued)

*Primary Examiner* — Minh Chau T Pham (57) ABSTRACT

A monitoring clip to be secured to the edge of a filter cartridge includes a channel connecting both sides of the filter through which air will flow in response to the filter becoming clogged. Air flow within the channel will eventually be strong enough to pivotally move a flow vane. Controlling circuitry is used to detect the angular movement of the flow vane. When the flow vane moves to a "triggering" position, it is determined that the filter is clogged and requires replacement. Controlling circuitry will sound and illuminate a local alarm, and send a signal by Bluetooth or WiFi, to a smartphone. Although a clip format is preferred, the measuring and controlling circuitry of the monitoring clip can be also built into new filters.

20 Claims, 11 Drawing Sheets

(56) References Cited

U.S. PATENT DOCUMENTS

| | | | |
|---|---|---|---|
| 2016/0089624 A1* | 3/2016 | Hopple | B01D 46/0086 95/25 |
| 2016/0243486 A1* | 8/2016 | Galsim | B01D 46/0086 |
| 2018/0015404 A1* | 1/2018 | Branzelle | B01D 46/2411 |

* cited by examiner

CLIP-ON MONITOR FOR DETECTING CLOGGED AIR-FILTERS

CLAIM OF PRIORITY

This application claims priority from U.S. Provisional Patent Application No. 62/486,386, filed Apr. 17, 2017, entitled: "Clip-On Monitor for Detecting Clogged Air-Filters," the contents of which are incorporated herein in their entirety.

BACKGROUND OF THE INVENTION a) Field of the Invention

The present invention relates to systems, methods, and apparatus for monitoring the condition of an air filter, and, in particular, such systems and devices that notify when such an air filter requires replacement.

b) Description of the Related Art

Air filters are often employed in a variety of internal flow systems to remove unwanted particulate matter from the flow stream, including dust, dander, soot and pollen. The present invention is particularly suited for use with disposable type air filters employed in heating, ventilating, and air conditioning ('HVAC') systems. Most air filters that are designed for residential HVAC systems are relatively inexpensive and are intended to be disposable, usually replaced at least once a year. They are typically made from spun-fiberglass, or pleated sheets of polyester or cotton paper and contained in a compact and lightweight cardboard frame.

For decades, many heating experts recommended changing, or at least inspecting, furnace (or AC) filters monthly. The filters at that time, like those that still come standard on many furnaces, were generally inch-thick fiberglass pads with a relatively large interstitial spacing between the fibers. These filters would do little to stop the microscopic particles that can lower Internal Air Quality (IAQ) within the home and cause breathing discomfort and lung-related health issues. These simple older filters were merely used to capture larger particles that could damage the furnace itself. Needless to say, the filter technology has improved considerably, and today, there are low cost filters that are capable of capturing much smaller particles. Some filters are rated as high-efficiency and include pleated filter material with a built-in electrostatic charge. For example, a product called "Filtrete", made by 3M of St. Paul, Minn., is capable of capturing up to 90 percent of mold spores and pet dander, which are in the range of 3 to 10 microns. The electrostatic charge within the filter works like a magnet to grab even smaller particles, such as bacteria, the particles that carry viruses, and the soot in smoke and smog. These smaller particles, under 3 microns, are closely linked to most lung-related health problems.

As a filter begins to clog, it will lose some capacity or efficiency in filtering the air flow, but more importantly, the excess pressure loss may also represent significant energy loss in the HVAC system and result in a higher burden on system equipment. The pressure and energy losses also translate to a reduction in the efficiency and capacity of the HVAC system to cool or heat the conditioned space.

Manufacturers typically recommend that the high-efficiency filters be changed every three months, and more conventional filters, every year. Unfortunately, every household is different and if a family has four cats, for example, or a smoker, the filters will clog much sooner as cat hair (dander) and large soot particles from the smoke will find their way back to the furnace or AC filter through the air-return duct. As the furnace (or AC) filter clogs, it will begin to restrict airflow, which will eventually prevent your furnace or air conditioner from moving heated, or cooled air efficiently. This will force your HVAC system to operate longer periods of time to achieve a desired temperature within the house, and the longer the HVAC appliance operates, the higher the gas or electricity bill.

Another consideration is that most home owners disregard the condition of their furnace or AC filter and likely fail to follow the recommended replacement regimen with any confidence.

An air filter is mounted in the flow stream generated by the HVAC system, typically near the inlet of the HVAC system. With the air flow directed through the filter media, the filter removes dust, dander and other impurities from the flow stream, and to some small degree, from within the space being serviced, such as a residential house.

The filter media of even a new or clean air filter presents some resistance to the air flow, which translates to a pressure loss or what is called a "head loss" (i.e., the pressure differential across the filter). The amount of the head loss is generally dependent on the flow restriction of the filter and the velocity of the airflow located upstream of the filter.

For clean and new filters, the head loss is acceptable in the system design since the benefits from filtration would generally outweigh the small increase in operational costs.

However, as the porous filter media accumulates impurities over time, the filter media will further restrict air flow and the pressure loss across the filter will quickly increase to unacceptable levels, leading to significant loss of capacity and efficiency in continued filtering of the air flow, and more importantly, excessive pressure loss at the output (e.g., a blockage of airflow). This will result in significant energy loss in the HVAC system and a higher burden on system equipment. The pressure and energy losses also translate to a reduction in the efficiency and capacity of the HVAC system to cool or heat the conditioned space. The filter must be replaced before it clogs.

It is, therefore, good practice to replace the filter (or, possibly, clean the filter media) at some point (or at some condition of the filter) when the accumulation of filtered matter in the filter media begins to significantly impact the HVAC system's performance. This target condition may be indicated directly by observation of an excess amount of accumulation of filtered matter on the filter or, just as directly, a significant increase in the pressure differential across the filter. Such methods of "monitoring" become ineffective, however, if the user (maintenance personnel, homeowner, etc.) fails to periodically and diligently monitor HVAC performance or simply fails to recognize that a specific filter condition warrants cleaning or replacement. Some products are available to aid in monitoring the condition of installed filters.

Unfortunately, these prior art devices are difficult to use and require complicated and invasive installation, often requiring the installer to drill into heating ducts to install pressure sensor pickup tubes.

It is a first object of the invention to provide a filter-condition monitoring system which overcomes the deficiencies of the prior art.

SUMMARY OF THE INVENTION

A monitoring clip to be secured to the edge of a filter cartridge includes a channel connecting both sides of the filter through which air will flow in response to the filter becoming clogged. Air flow within the channel will eventually be strong enough to pivotally move a flow vane. Controlling circuitry is used to detect the angular movement of the flow vane. When the flow vane moves to a "triggering" position, it is determined that the filter is clogged and requires replacement. Controlling circuitry will sound and illuminate a local alarm, and send a signal by Bluetooth or WiFi, to a smartphone.

Although a clip format is preferred, the measuring and controlling circuitry of the monitoring clip can be also built into new filters.

The features of this invention, and the manner of attaining them, will become more apparent and the invention itself will be better understood by reference to the following description of the disclosed embodiments taken in conjunction with the accompanying drawings.

DETAILED DESCRIPTION OF THE PREFERRED EMBODIMENTS

By way of overview, the present invention is a monitoring device meant to be attached to a filter cartridge by clipping it along an edge of the cartridge. The present device uses changes in differential pressure on both sides of the filter to determine if the filter has reached a predetermined degree of collected-particulate obstruction (i.e., it's clogged) and activates an alert to a user.

Figure 1:
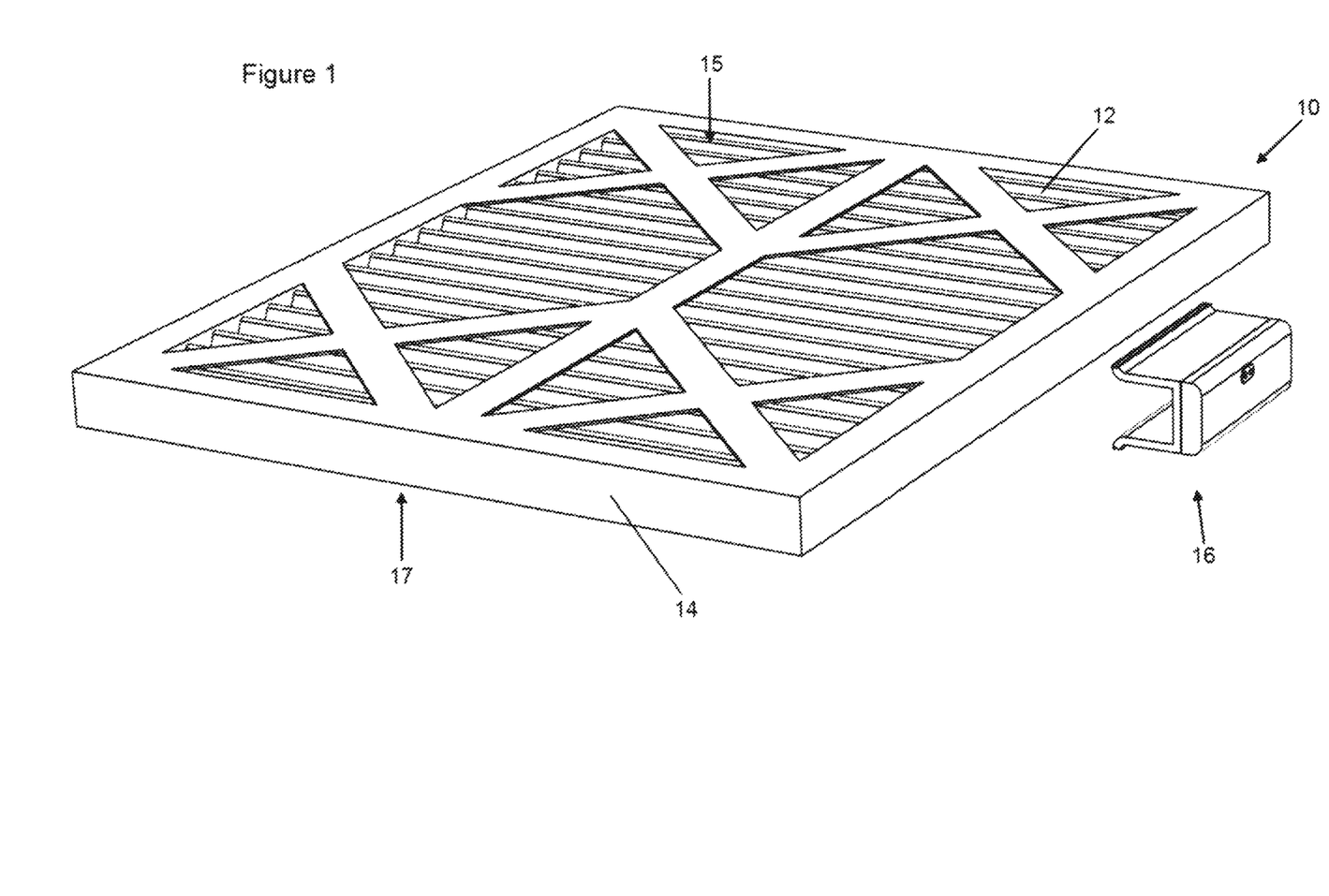
FIG. 1 is a perspective view of an exemplary HVAC filter cartridge and a filter-condition monitoring clip, showing the monitoring clip detached from the filter cartridge, in accordance with the present invention.
Figure 2:
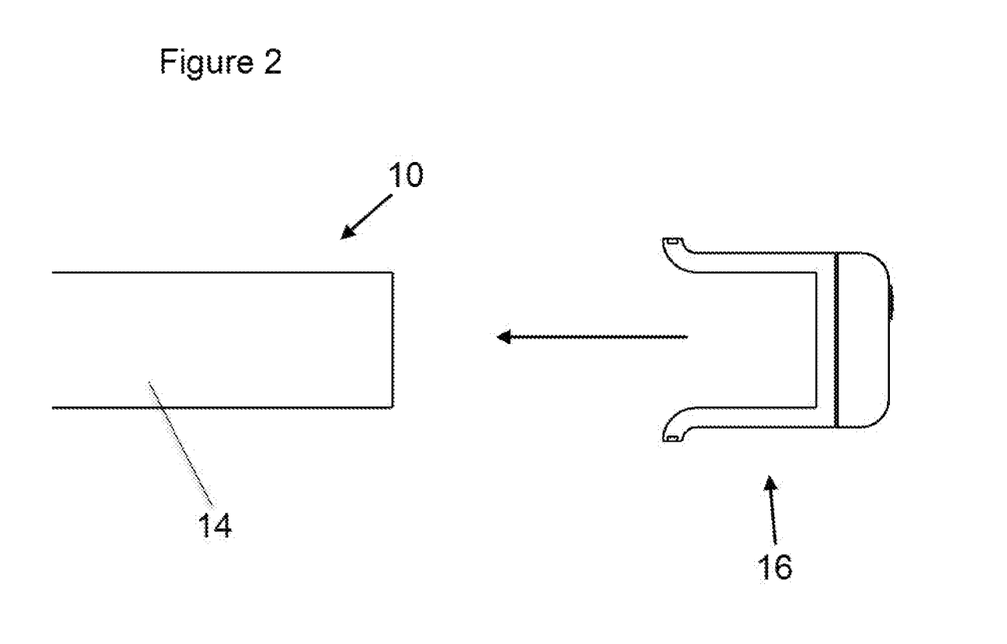
FIG. 2 is a side partial view of the exemplary HVAC filter cartridge and filter-condition monitoring clip of FIG. 1, according to the present invention.

Referring to FIG. 1, an exemplary filter cartridge 10 is shown to help explain the present invention. Filter cartridge 10 of this type is typically rectangular and made up of filter material 12, which usually includes spun-fiberglass, sheets of polyester or sheets of cotton paper. The filter material is pleated or folded to increase surface area and contained in a compact and lightweight cardboard frame 14. Although conventional filter cartridges 10 for residential HVAC use will vary in dimensional size, most are rectangular in shape and most are standardized at 1 inch thick. Filter cartridge 10 includes an inlet side 15 and an outlet side 17. Once installed in a furnace or air conditioner, air will pass through inlet side 15 first of filter cartridge 10 and then through outlet side 17 before entering the furnace or AC unit.

Figure 3:
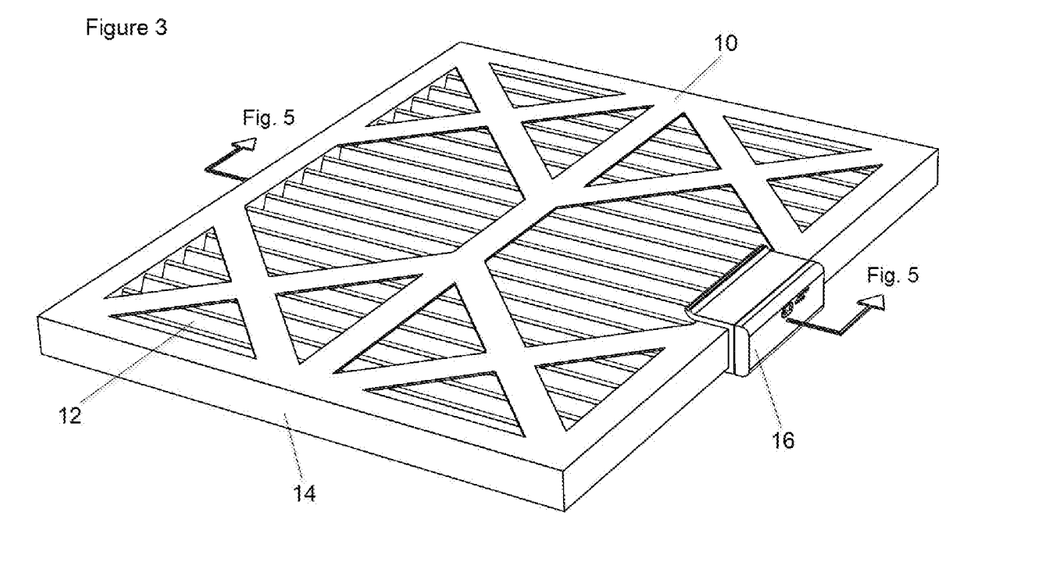
FIG. 3 is a perspective view of the exemplary HVAC filter cartridge and the filter-condition monitoring clip of FIG. 1, showing the monitoring clip secured to the filter cartridge, according to the present invention.
Figure 4:
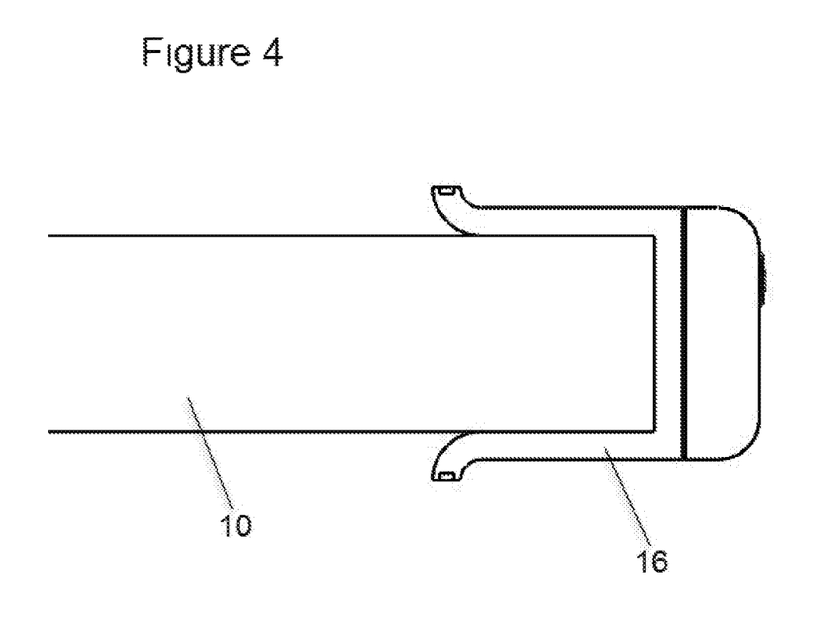
FIG. 4 is a side partial view of the exemplary HVAC filter cartridge and filter-condition monitoring clip of FIG. 3, according to the present invention.
Figure 5:
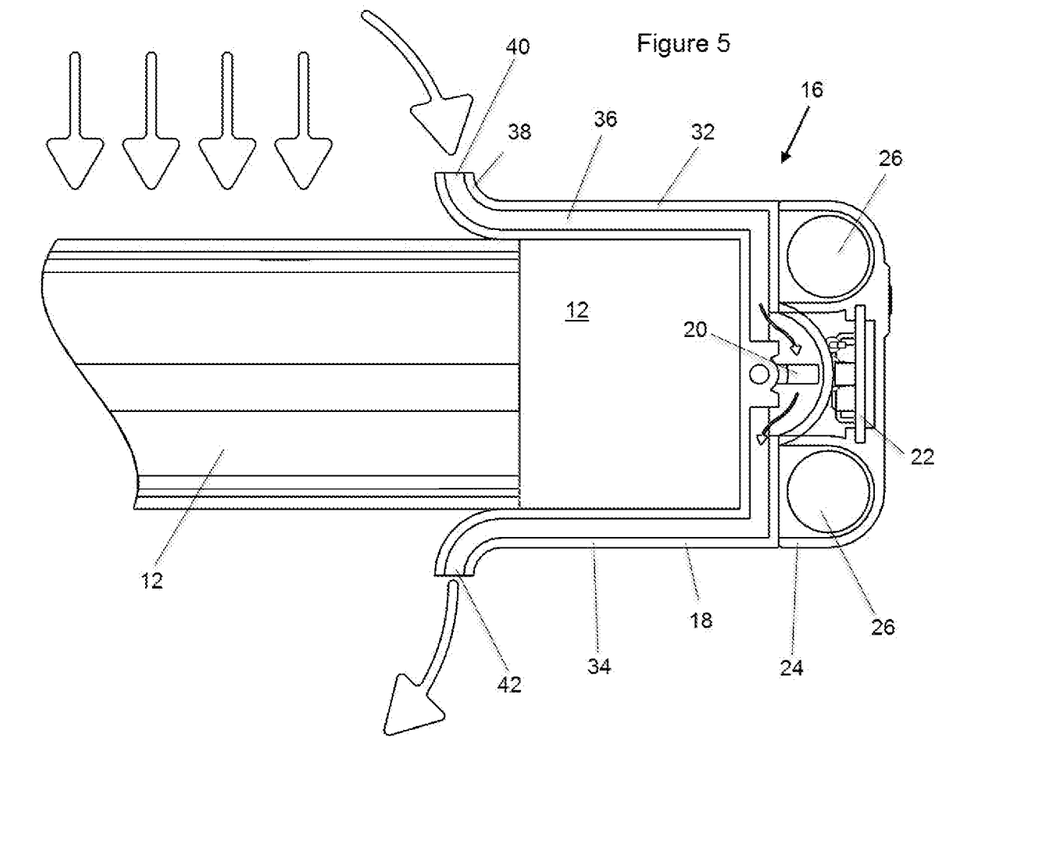
FIG. 5 is a sectional partial view of the exemplary HVAC filter cartridge and a filter-condition monitoring clip of FIG. 3, taken along the line 5-5 of FIG. 3, showing details of the airflow through the monitoring clip, according to the present invention.
Figure 9:
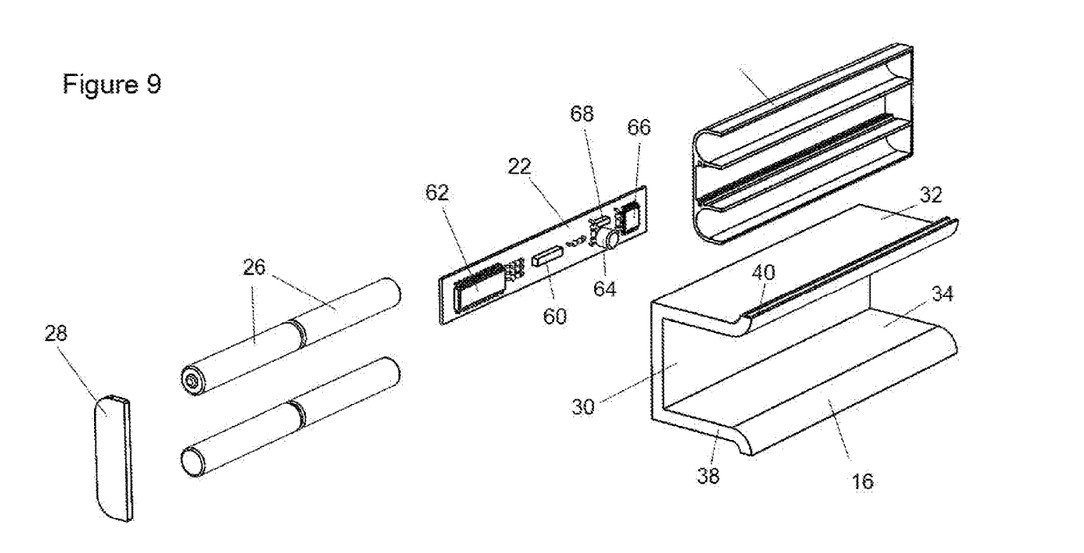
FIG. 9 is an assembly view of the monitoring clip according to the present invention.

As shown in FIGS. 1, 5 and 9, and according to the invention, a monitoring clip 16 includes a hollow squared-off C-shaped housing 18, a flow-sensor 20, a controlling and supporting circuitry 22, a battery housing 24, batteries 26 and a battery cover plate 28. Housing 18 is preferably made from a strong resilient thermoplastic and sized and shaped to snugly fit along the edge of a standardized residential (1 inch thick) filter cartridge 10, as shown in FIG. 3, preferably held thereto by friction.

Figure 6:
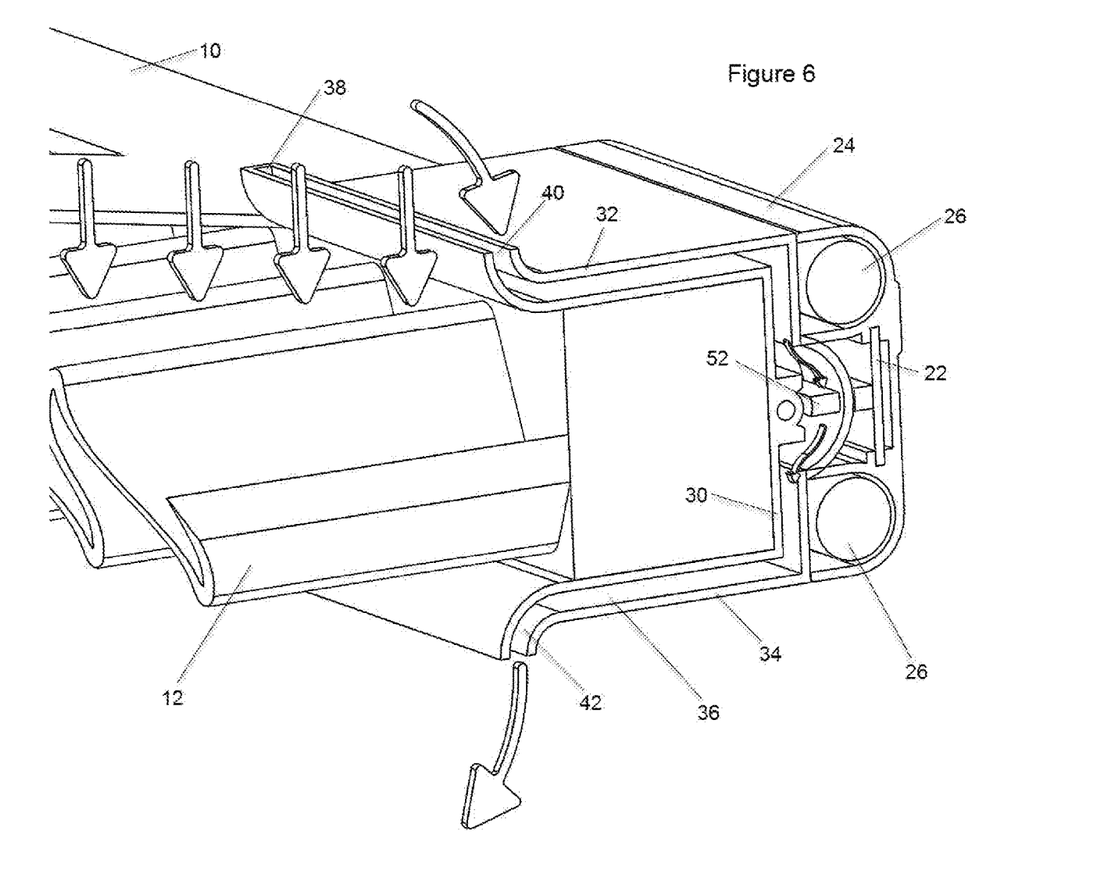
FIG. 6 is a perspective view of the sectional partial view of the HVAC filter cartridge and filter condition monitoring clip of FIG. 5, showing the monitoring clip in a non-triggered condition, according to the present invention.

As mentioned above, housing 18 is squared-off C-shaped, defining a vertical back wall 30 connected to two extended "legs," a top leg 32 and a bottom leg 34 (identified for the purpose of explaining the invention). The length of housing 18 should be sufficient to adequately house the required components, including circuitry 22 and batteries 24, but is preferably between 3 and 5 inches in length. Housing 18 includes a hollow channel 36 which follows the C-shape of housing 18 and preferably extends its entire length. Channel 36 is sealed off on the ends 38 of housing 18 and includes an elongated inlet 40, as shown in FIG. 3, and an outlet 42, as shown in FIGS. 5 and 6.

The purpose of hollow channel 36 is to provide fluid communication between inlet side 15 and outlet side 17, of filter cartridge 10. The sectional area of this channel will effectively control the airflow passing through the channel. The thickness of channel 36 is preferably made as narrow as possible so that the overall wall thickness of top leg 32 and bottom leg 34 is kept to a minimum. A thinner housing structure will mitigate interference between filter cartridge 10 and an adjacent filter holder or receptacle (not shown).

Airflow Channels:

As shown in the figures, inlet 40 of housing 18 is preferably curved upward, away from inlet side 15 of filter cartridge 10. Similarly, outlet 42 of housing 18 is preferably curved downward, away from outlet side 17 of filter cartridge 10. This curved feature helps to discourage inlet 40 from getting clogged with particulate matter and also helps the user easily slip monitoring clip 16 onto the edge of the cardboard frame 14 of filter cartridge 10. The curved feature of outlet 42 is not necessary, but is preferred for symmetry and for helping a user slip monitoring clip 16 into plate on filter cartridge 10.

During normal use, monitoring clip 16 is secured to filter cartridge 10, as shown in FIGS. 3-6. Filter cartridge 10 is properly installed in a heating, ventilating, or an air conditioning system so that air flow within the ventilation system passes through filter material 12 on inlet side 15 and then leaves filter material 12 on outlet side 17. Filter material 12 captures particulate matter as air flow passes therethrough.

If filter cartridge is relatively new, then the head pressure against inlet side 15 of filter cartridge 10 would be relatively low. Air would not be restricted and would pass through filter material relatively easily. In these unclogged conditions, little air would pass through channel 36 of housing 18 since there would be more head pressure at inlet 40 of channel 18 than the head pressure in the much larger filter material immediately adjacent, since that filter material is currently unclogged. However, as filter cartridge 10 remains within the HVAC system, filter material begins to collect airborne particulate matter and the interstices of the filter material begin to clog. When this happens, the head pressure of the inlet side 15 of filter cartridge 10 rises whenever the blower fan operates. This rise in head pressure will force a greater amount of air through the small, but unclogged channel 18 of monitoring clip 16. Therefore, the magnitude of air flow through channel 18 is related to the degree of clogging of filter material 12. Monitoring clip 16, as explained below, measures the airflow passing through channel 18 and uses this information to determine the degree of clogging of filter material 12 and eventually, to notify when filter cartridge 10 requires cleaning or replacement.

Figure 7:
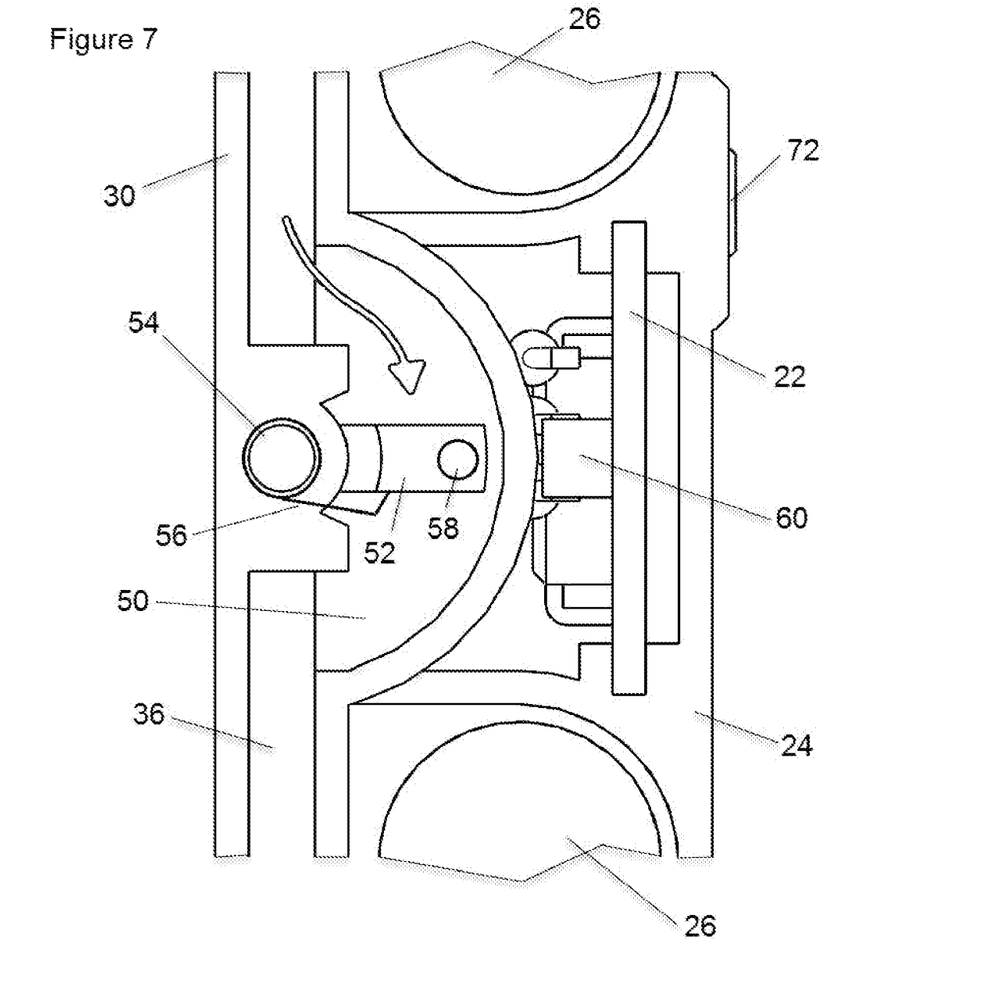
FIG. 7 is an enlarged side view of the monitoring clip of FIG. 5, showing details of the air-flow vane and vane-position sensor, with the air-flow vane shown in a non-triggered position, according to the present invention.

Airflow Sensing:

Referring to FIGS. 5-8, sectional views of monitoring clip 16 are shown. According to the invention, flow-sensor is located within the flow path of channel 36 and includes an integral sensing chamber 50. According to this first embodiment of the invention, a pivotally mounted flow vane 52 is positioned within sensing chamber 50. Flow vane 52 responds to increasing airflow (as the airflow pushes against the flow vane with a force) within channel 36 by rotating from a rest position about axle 54, shown in FIGS. 5-7 to a "triggered" position, shown in FIG. 8. As shown in FIG. 7, an axial spring 56 is positioned about axle 54 and is used to provide a spring bias to flow vane 52 so that the vane is encouraged to remain at its rest position (shown in FIGS. 5-7). Flow vane 52 will rotate against the spring bias when an airflow force exceeding the torsion force of spring 56 pushes against flow vane 52. Spring 56 includes a predetermined spring tension and is preferably constant, but may vary, as set by the user to adjust the spring tension based on the size and type of the air filter and the particulars of the HVAC system.

As mentioned above, as filter material 12 captures more and more particulate material, during operation of the HVAC ventilation system, the head pressure on the inlet side 15 of filter cartridge 10 will increase. As this head pressure increases, the airflow in the system will "look" for any path with less head-pressure. Monitoring clip 16, according to the invention, offers such a path, channel 36. As filter cartridge 10 slowly clogs, airflow within channel 36 will slowly increase and the force of the this airflow within sensing chamber 50 acting on flow vane 52 will also increase. Eventually, the force of the airflow will overcome the spring-bias of spring 56, as mentioned above and flow vane 52 will rotate from its first rest position, as shown in FIGS. 5-7, towards its second triggering position, shown in FIG. 8.

According to a preferred embodiment of the present invention, flow vane 52 is made from a plastic and includes a magnet 58 (or a small piece of iron) integrally molded therein, located at a distal end, away from axle 54. Magnet 58 will pivot about axle 54 when flow vane 52 pivots and the arcuate movement of magnet 58 can be measured using a Hall-effect sensor 60 located within controlling and supporting circuitry 22. As is well known by those skilled in the art, a Hall-effect sensor measures changes of a current within a circuit by the influence of a nearby magnetic field. The end result is that Hall-effect sensor 60 can accurately measure the small movements of magnet 58 and thereby the rotational position of flow vane 52. As is well known, the output current of Hall-effect sensor 60 will require amplification.

Hall-effect sensor 60 may be influenced by nearby magnetic fields, so it is preferred that Hall-effect sensor 60 be shielded, as is known in the art. Although the use of a Hall-effect sensor is preferred, other methods may be used to measure the rotational position of flow vane 52, including the use of an opto-coupler, wherein the deflection of a light beam is measured and used to determine the angle of movement of the flow vane.

Controlling and Supporting Circuitry:

Referring to FIG. 9, controlling and supporting circuitry 22 is shown, along with battery housing 24, batteries 26 and battery cover plate 28. In this exemplary housing arrangement, battery housing 24 is made from an appropriate plastic and includes a pair of integrally molded longitudinal channels 60 which are sized and shaped to snugly receive the edges of the printed circuit board of controlling and supporting circuitry 22. Battery housing 24 also includes molded recesses for snugly receiving batteries 26, as is well known. Battery cover plate 28 is also made from plastic and is sized and shape to cover the open end of battery housing 24, using any of many well known snap-fit closure mechanisms, not shown in detail here.

Figure 8:
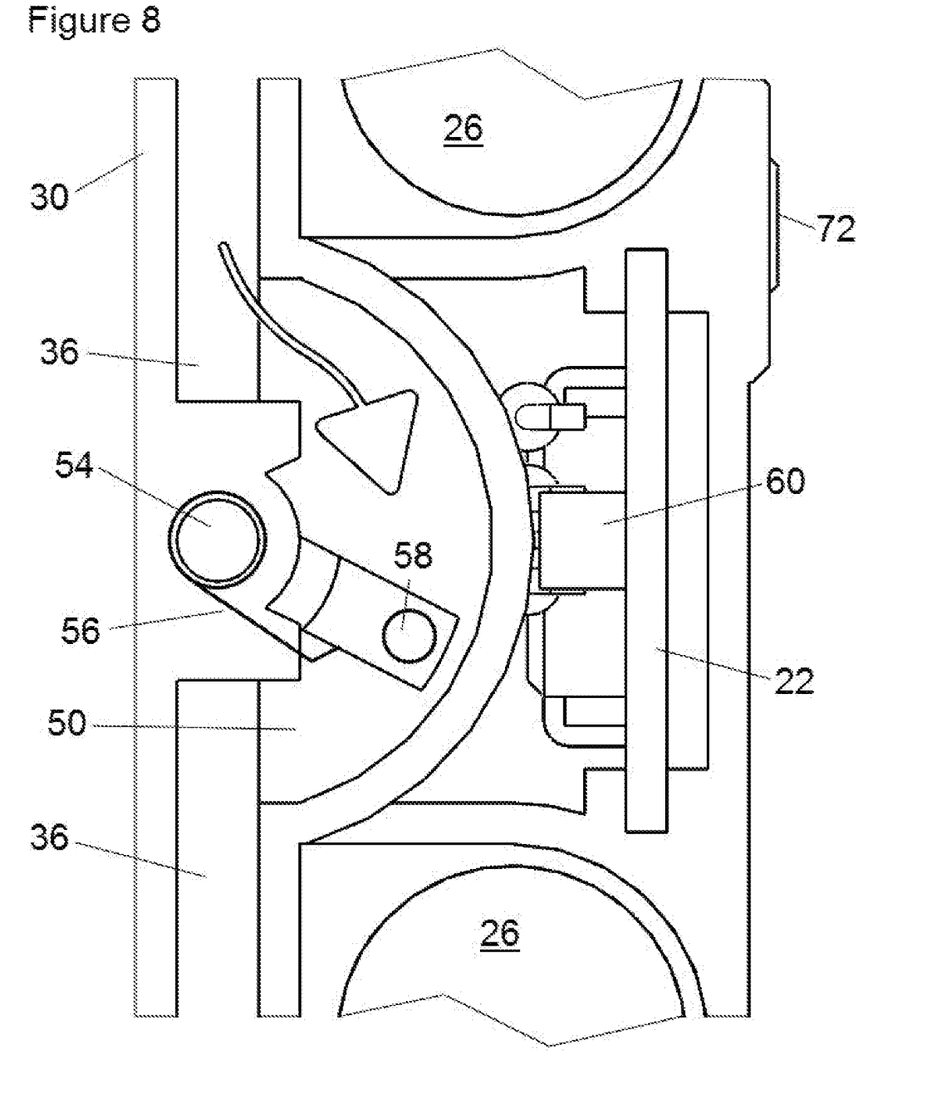
FIG. 8 is an enlarged side view of the monitoring clip of FIG. 5, showing details of the air-flow vane and vane-position sensor, but with the air-flow vane shown in a triggered position, according to the present invention.

As shown in FIGS. 5 and 6, battery housing 24 is secured to back wall 30 using an appropriate adhesive, mechanical fasteners, or is integrally molded. When assembled, Hall-effect sensor 60 of controlling and supporting circuitry 22 will be positioned immediately adjacent to sensing chamber 50, as shown in FIGS. 7 and 8, but will be isolated (and protected) from any airflow located within either channel 36 or sensing chamber fluid 50.

Figure 11:
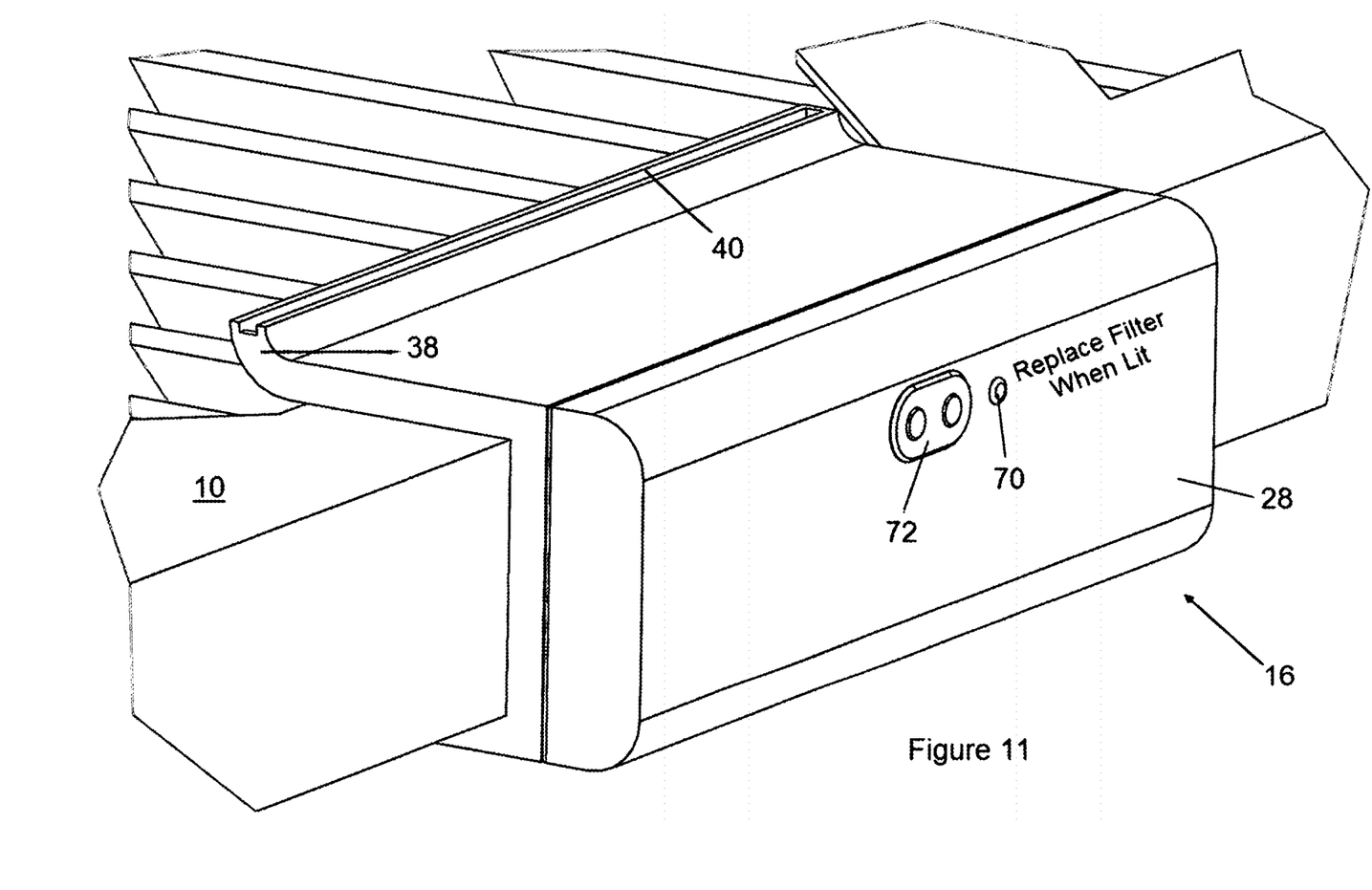
FIG. 11 is a perspective rear view of the monitoring clip attached to a filter cartridge, according to the invention, showing an LED and control buttons.

According to the invention, controlling and supporting circuitry 22 includes sensing circuitry, such as the above-mentioned Hall-effect sensor 60, an necessary amplifying circuitry (not labeled), a microprocessor 62, a local sound generator 64, such as a Piezo buzzer/speaker, wireless communication circuitry 66, an accelerometer 68, an LED 70 and input control buttons 72 (see FIG. 11).

Figure 10:
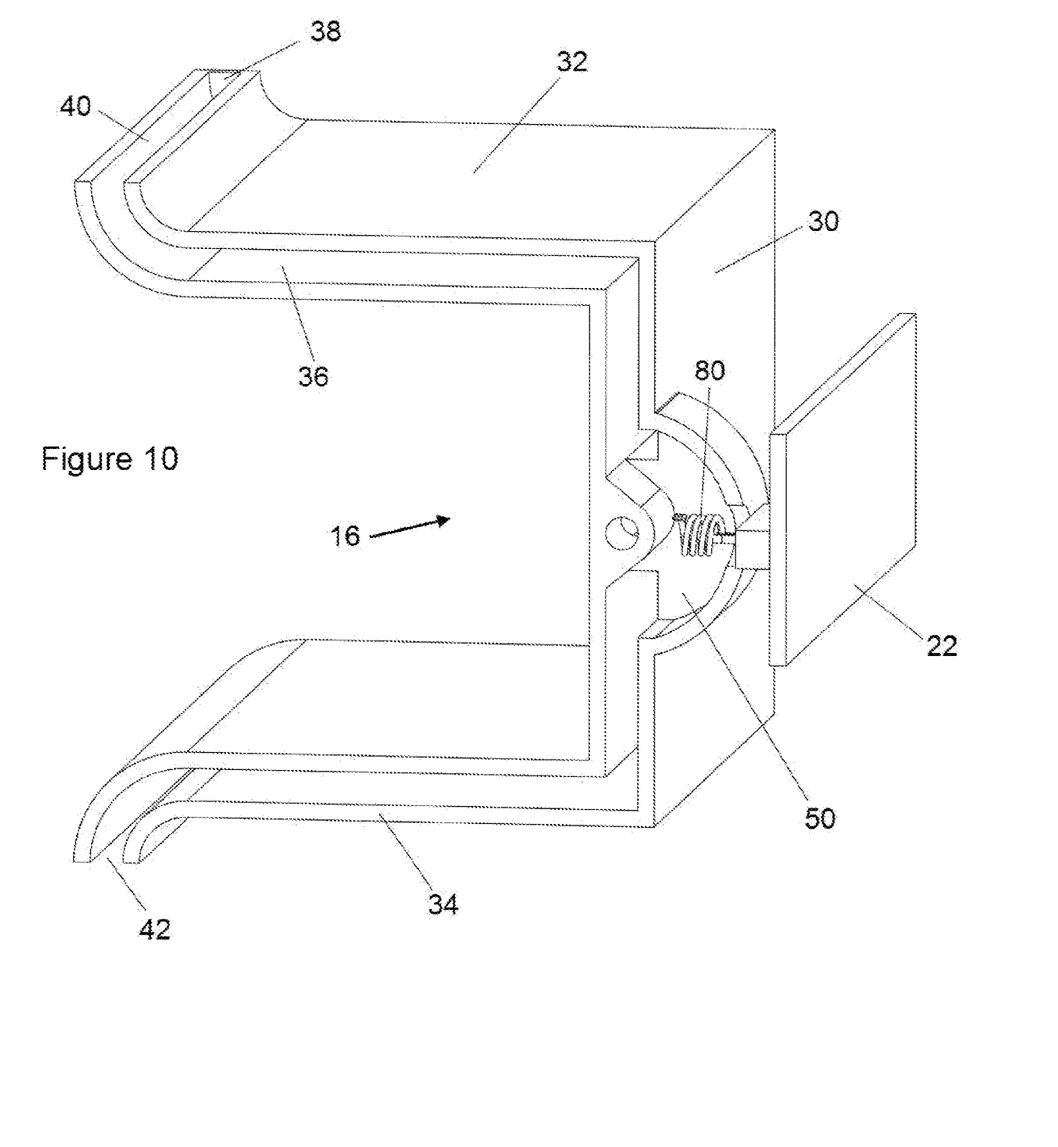
FIG. 10 is a perspective cross-sectional view of the monitoring clip, according to a second embodiment of the present invention, showing details of a heated thermistor arrangement.

Referring to FIG. 10, another embodiment of the invention is shown wherein clip 16 includes a heated thermistor 80, in place of using flow vane 52, and Hall-effect sensor 60. As is well known in the art, a thermistor is an electrical component with an electrical resistance that changes in response to temperature. They are thermally sensitive resistors and when used in combination with an adjacent heating element, they can be used to measure the flow of air within channel 36. As airflow increases within channel 36, the flow will remove heat from thermistor 80 and the resulting change in resistance due to the drop in temperature (as measured by a conventional and well known Wheatstone bridge comparing circuit), is indicative of the air flow magnitude, and therefore is also an indication of the magnitude of head pressure on the inlet side 15 of filter 10, and therefore an indication of the level of occlusion of filter material 12.

In Operation:

When a consumer installs a new filter cartridge 10 into their HVAC system, such as a furnace, the user will first remove the old clogged filter and then will slip monitoring clip 16 over one edge of the new filter cartridge. The top leg 32 and bottom leg 34 of the monitoring clip will provide a slight spring-bias to gently and snugly squeeze onto the edge of cardboard frame 14 of filter cartridge 10. Clip 16 will hold onto filter cartridge 10 by friction. Once attached, the user will simply turn on controlling and supporting circuitry 22 by depressing the appropriate control button 72, as shown in FIG. 11, and insert the new filter cartridge 10 into an appropriate slot or tray provided by the furnace or adjacent ducting. The size and shape of monitoring clip 16 is such that it does not interfere with the installation, operation or performance of filter cartridge 10.

Once clip 16 is activated, it will automatically communicate with a local WiFi using wireless communication circuitry 66, as is well known in the art. The consumer may download a software application which communicates with monitoring clip 16 and downloads information from the clip, as necessary, such as filter "clog" status, and estimated time before replacement is required.

Microprocessor 62 includes onboard software which controls the operation of monitoring clip 16. An internal clock within microprocessor 62 is used to control the time when the position of flow vane 52 is measured, using either Hall-effect sensor 60, or another type of sensor. Since the blower fan of the HVAC system must be operating for any air to flow into channel 36 of housing 18, microprocessor 62 must then know when the blower is on before sensing the position of flow vane 52. Accelerometer 68 is used to determine when the furnace or AC unit is blowing air, since the blower will create a consistent vibration signature that can be measured and detected by the accelerometer. To help the clip learn this signature, Applicants' contemplate that during initial installation, the user instructs the clip when the blower fan is active so that the onboard accelerometer 68 can read and "learn" the particular vibration signature and store this for later comparison in microprocessor 62.

Alternative to using accelerometer 68, controlling circuitry 22 may include a microphone (not shown) to monitor for audible signatures of the relatively loud adjacent blower fan, when it turns on. A thermocouple or other device to measure temperature can be used to measure a sudden change in temperature, which would indicate that HVAC equipment is on.

Once it is determined that the blower fan is blowing, microprocessor 62 can interrogate Hall-effect sensor 60 to measure the relative angular position of flow vane 52 within sensing chamber 50. To improve accuracy, microprocessor 62 can wait a period of time (such as 2 minutes) before interrogating sensor 60 to measure the angular position of flow vane 52. This time delay will allow the head pressure to stabilize after the furnace (or other HVAC device) is first activated.

As explained above, as the filter material 12 collects airborne particulate material, the interstices of the filter occlude, which causes the head pressure at the inlet side of filter cartridge 10 to increase. Eventually, this head pressure will cause the flow of air passing through channel 36 of housing 18 to increase. The air flow in channel 36 will contact flow vane 52 and will apply a force to the vane surface, which will translate to a torque about axle 54. When this torque exceeds the spring-bias torque of spring 56, the vane will rotate about axle 54. The angular position of vane 52 should hold consistent during each period the HVAC blower remains on, but the vane will slowly pivot from the "rest" orientation to the "triggered" orientation, as filter material continues to occlude over time.

After Hall-effect sensor 60 measures the angular orientation of flow vane 52, microprocessor 62 then calculates, using an algorithm, an estimated magnitude of filter occlusion. This algorithm is based on the current angular position of the vane, the angular position of the vane in the previous measurement, and the time since the last measurement.

Based on this information, microprocessor 62 can estimate when the filter will be considered clogged and require replacement. Microprocessor 62 instructs wireless communication circuitry 66 to send a notification using WiFi or Bluetooth communications to the user's smart device, such as a smartphone or any device connected to the user's WiFi, such as a light or buzzer mounted somewhere in the user's house (e.g., the user's kitchen or office). Applicants contemplate that wireless communication circuitry 66 sends a notification using WiFi or Bluetooth to the user's door bell (which in this case would be a "smart" doorbell), causing the doorbell to announce a message or alert indicated that the furnace requires maintenance. The application on the smartphone can convey the predicted time for filter replacement using numbers, a calendar date, or graphics, such as a bar graph, or pie-chart. If it is determined that the flow vane has reached the triggered orientation, then an alert can be sent to the user's phone, such as a banner or a text message. Additionally, or alternatively, the local sound generator 64 can be activated so that monitoring clip 16 will emit a periodic buzzing or chirping sound, similar to a smoke detector chirping to indicate that the battery needs replacement. Also, LED 70 can illuminate and flash. Microprocessor 62 can also cause a remotely mounted secondary LED (not shown) to illuminate and flash, as well as a remote buzzer to sound.

Although the present invention was described above as a clip-on device that can be easily secured to the edge of a filter cartridge, the sensing and controlling circuitry located within the above-described clip 10 can be integrated into new filter cartridges as an OEM device without departing from the invention.

The invention claimed is:

1. A device for indicating a obstructed status of a filter assembly positioned within an HVAC airflow, said filter assembly including filter material having a first and second side, and through which said HVAC airflow passes, said filter material being supported within a peripheral frame, said device comprising:
    a C-shaped housing frictionally securable to said frame of said filter assembly so that a first side of said housing resides on said first side of said filter material, and an opposing second side of said housing resides adjacent to said second side of said filter material, said housing including a passageway which is sized and shaped to allow a portion of said HVAC airflow to pass therethrough, said portion of said HVAC airflow passing through said passageway in response to said filter material becoming obstructed;
    a control circuit, including a power supply;
    a flow-sensor attached to said housing for sensing the amount of said HVAC air-flow passing through said passageway; and
    an indicator for indicating when said flow-sensor senses a predetermined flow rate of HVAC airflow passing through said passageway, indicating an obstructed filter.

2. The device of claim 1, wherein said indicator includes a source of illumination, which illuminates in response to said flow-sensor sensing said predetermined flow rate of HVAC airflow passing through said passageway.

3. The device of claim 1, wherein said control circuit includes RF wireless communication and wherein a wireless signal is transmitted from said control circuit in response to flow-sensor sensing said predetermined flow rate of HVAC airflow passing through said passageway.

4. The device of claim 3, wherein said RF wireless communication circuit communicates with a mobile device to display said obstructed status of said filter on said mobile device.

5. The device of claim 1, wherein said HVAC airflow is generated using a blower fan and wherein said device further comprises an accelerometer to detect vibrations from said blower fan.

6. The device of claim 1, wherein said flow-sensor includes a movable element located in said passageway, said moveable element moving in response to airflow within said passageway.

7. The device of claim 6, wherein said moveable element is a flow vane which is pivotally attached to said housing and which pivots in response to airflow within said passageway.

8. The device of claim 7, wherein said housing further includes a position sensor for detecting the relative position of said flow-vane with respect to said housing to determine the flowrate of air moving within said passageway.

9. The device of claim 1, wherein said flow-sensor includes a thermistor component located within said passageway, said thermistor component being of the type that changes electrical resistance in response to a change in temperature and wherein a change in airflow within said passageway causes said thermistor to change temperature.

10. The device of claim 7, wherein said flow vane includes a magnet and wherein said control circuit includes a Hall-effect sensor, said Hall-effect sensor detecting.

11. The device of claim 1, wherein said indicator includes a sound generator, which generates a sound in response to said flow-sensor sensing said predetermined flow rate of HVAC airflow passing through said passageway.

12. The device of claim 1, wherein said HVAC airflow is generated using a blower fan and wherein said device further comprises a microphone to detect select sounds generated by said blower fan.

13. A device for indicating a obstructed status of a filter assembly positioned within an HVAC airflow to determine if a filter assembly requires replacement, said filter assembly including filter material having a first and second side, and through which said HVAC airflow passes, said filter material being supported within a peripheral frame, said device comprising:
    a C-shaped housing frictionally and selectively securable to said frame of said filter assembly so that a first side of said housing resides on said first side of said filter material, and an opposing second side of said housing resides adjacent to said second side of said filter material, said housing including a passageway extending between said first and second sides of said housing and which is sized and shaped to allow a portion of said HVAC airflow to pass therethrough, said portion of said HVAC air-flow passing through said passageway in response to said filter material becoming obstructed;
    a control circuit, including a power supply, said control circuit including a timing circuit;
    a flow-sensor attached to said housing for sensing the amount of said HVAC air-flow passing through said passageway, said control circuit reading said flow-sensor at predetermined time intervals, as measured by said timing circuit; and
    an indicator which is activated when said control circuit determines by reading said flow-sensor that said predetermined flow rate of HVAC airflow is passing through said passageway.

14. The device of claim 13, wherein said indicator includes a sound generator, which generates a sound in response to said control circuit determining by reading said flow-sensor that said predetermined flow rate of HVAC airflow is passing through said passageway.

15. The device of claim 13, wherein said indicator includes a source of illumination, which illuminates in response said control circuit determining by reading said flow-sensor that said predetermined flow rate of HVAC airflow is passing through said passageway.

16. The device of claim 13, wherein said flow-sensor includes a moveable element located in said passageway, said moveable element moving in response to airflow within said passageway.

17. The device of claim 16, wherein said moveable element is a flow vane which is pivotally attached to said housing and which pivots in response to air-flow within said passageway.

18. The device of claim 17, wherein said housing further includes a position sensor for detecting the relative position of said flow-vane with respect to said housing to determine the flowrate of air moving within said passageway.

19. The device of claim 13, wherein said flow-sensor includes a thermistor component located within said passageway, said thermistor component being of the type that changes electrical resistance in response to a change in temperature and wherein a change in airflow within said passageway causes said thermistor to change temperature.

20. A method for monitoring and indicating when an HVAC filter is clogged and requires replacement, the filter being of the type which includes filter material having a first and a second side, and through which air from an HVAC system flows, said filter material being supported within a peripheral frame, said method comprising the steps of:
    securing a C-shaped clip-monitor to said peripheral frame, said monitor including a passageway extending between said first and second sides of said filter material, a control circuit, a power supply, a flow-sensor and an indicator, said passageway being sized and shaped to receive a portion of said airflow from said HVAC system;
    installing said filter, with said clip-monitor secured, within an HVAC system so that air from said HVAC system passes through said filter;
    reading, by said control circuit, said airflow sensor to determine the flowrate value of said portion of said air flow from said HVAC system which is passing through said passageway of said clip-monitor;
    comparing, by said control circuit, said flow rate of said reading step with a stored flow rate value, said stored flow-rate value representing a flow rate associated with a clogged filter; and
    activating, by said control circuit, said indicator in response to said comparing step shows that said flow rate of said reading step equals or exceeds said stored flow rate value.

* * * * *